No. 842,594. PATENTED JAN. 29, 1907.
G. H. & L. C. VAN VLECK.
FISH HOOK.
APPLICATION FILED OCT. 1, 1906.

Witnesses.
Hazel B. Hiett

Inventor.
G. H. & L. C. Van Vleck,
By their attorneys.

UNITED STATES PATENT OFFICE.

GEORGE H. VAN VLECK AND LOUIS C. VAN VLECK, OF TOLEDO, OHIO.

FISH-HOOK.

No. 842,594.   Specification of Letters Patent.   Patented Jan. 29, 1907.

Application filed October 1, 1906. Serial No. 336,845.

*To all whom it may concern:*

Be it known that we, GEORGE H. VAN VLECK and LOUIS C. VAN VLECK, citizens of the United States, and residents of Toledo, in the county of Lucas and State of Ohio, have invented a new and useful Fish-Hook; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to hooks for use in catching tarpon and other large gamy fish, and has for its object the provision of a hook that will pierce the mouth of a fish more readily than those now in common use and will at the same time be more securely retained therein.

We accomplish the objects of our invention by means of the construction shown in the accompanying drawings, in which—

Figure 1:
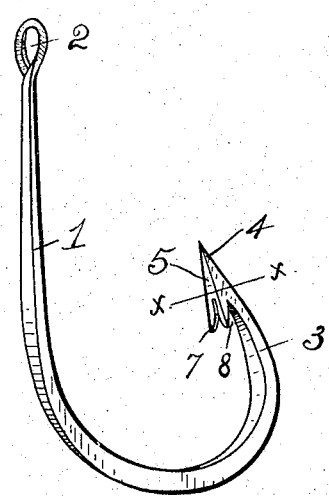
Figure 2:
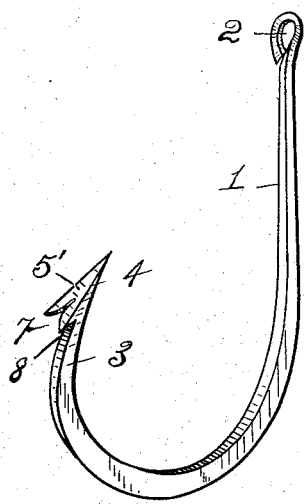

Figure 1 is a perspective view of a hook with the barb on the inside. Fig. 2 is a similar view showing the barb on the outside, and Fig. 3 an enlarged sectional view on the line x x of Fig. 1.

Figure 3:
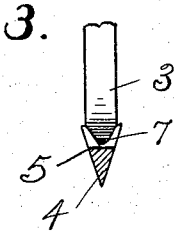

In the drawings, 1 represents the shank of the hook, 2 the eye, 3 the bill, and 4 the point. The point 4 is substantially triangular in cross-section, as best shown in Fig. 3, and the edges thereof, or two of them, are preferably made sharp, so that the point has a tendency to cut a small triangular hole when piercing the mouth. The point has a flat face 5, which may be located either on the side toward the shank, as shown in Fig. 1, or on the outside, directly opposite the shank, as shown at 5' in Fig. 2. This flat face terminates at its lower end in the forked barb 7, said barbs being spaced from the bill by a notch 8, as shown. The form of point shown in Fig. 2 is preferable, for the reason that it is much more difficult for a fish to dislodge it than when the barb is on the inside.

Another feature of the hook is the form of bend which brings the point 4 substantially in the direct line of pull on the line, wire, or chain attached to the eye 2, as this materially facilitates the hooking of a fish.

It will be noted that the hook thus formed is provided with a long, narrow, and gradually-tapering point, the width of the flat face of which at its forked terminal is only slightly greater than the corresponding width of the bill or the hook-shank, thus cutting in a fish's mouth a hole which is very little larger than the hook-bill.

Having thus described our invention, what we claim, and desire to secure by Letters Patent, is—

1. A fish-hook provided with a long, narrow and gradually-tapered point, one side of which terminates in a forked barb and having a notch 8 which spaces the barbs from the bill.

2. A fish-hook having a point terminating in a forked barb on the outer side of the bill, the barbs being spaced from the bill by a common notch provided in the bill at the base of the point.

3. A fish-hook having a point triangular in cross-section, said point having one flat side which terminates in a forked barb.

In testimony whereof we have hereunto signed our names to this specification in the presence of two subscribing witnesses.

GEORGE H. VAN VLECK.
LOUIS C. VAN VLECK.

Witnesses:
FRANK DRAKE,
H. F. CRANDALL.